(12) United States Patent
Wexler et al.

(10) Patent No.: US 7,064,861 B2
(45) Date of Patent: Jun. 20, 2006

(54) METHOD FOR RECORDING A DIGITAL IMAGE AND INFORMATION PERTAINING TO SUCH IMAGE ON AN ORIENTED POLYMER MEDIUM

(75) Inventors: Ronald M. Wexler, Rochester, NY (US); Robert P. Bourdelais, Pittsford, NY (US); Kevin E. Spaulding, Spencerport, NY (US); Robert C. Bryant, Honeoye Falls, NY (US); Drew D. Summers, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 994 days.

(21) Appl. No.: 09/730,217

(22) Filed: Dec. 5, 2000

(65) Prior Publication Data

US 2002/0097409 A1    Jul. 25, 2002

(51) Int. Cl.
  *G06K 1/00*  (2006.01)
  *G06K 9/00*  (2006.01)
(52) U.S. Cl. .................. 358/1.9; 358/3.28; 382/162; 382/165
(58) Field of Classification Search .......... 358/1.9, 358/3.28; 430/358, 201, 56, 496, 21, 22, 430/359, 364, 533, 536; 380/50, 51; 382/162, 382/165
See application file for complete search history.

(56) References Cited

U.S. PATENT DOCUMENTS

| 4,377,616 A | 3/1983 | Ashcraft et al. |
| 4,632,869 A | 12/1986 | Park et al. |
| 4,758,462 A | 7/1988 | Park et al. |
| 4,831,434 A * | 5/1989 | Fuchsberger ................ 358/521 |
| 5,514,860 A | 5/1996 | Berson |
| 5,542,971 A | 8/1996 | Auslander et al. |
| 5,841,885 A * | 11/1998 | Neff et al. ................... 382/112 |
| 5,866,282 A | 2/1999 | Bourdelais et al. |
| 5,874,205 A | 2/1999 | Bourdelais et al. |
| 5,968,719 A * | 10/1999 | Nakamura ................... 430/394 |
| 6,218,004 B1 * | 4/2001 | Shaw et al. .................. 428/336 |
| 6,239,818 B1 * | 5/2001 | Yoda ............................ 347/43 |
| 6,270,610 B1 * | 8/2001 | Benoit et al. ............... 156/220 |

(Continued)

FOREIGN PATENT DOCUMENTS

EP    0723189    7/1996

(Continued)

*Primary Examiner*—Edward Coles
*Assistant Examiner*—Chan S. Park
(74) *Attorney, Agent, or Firm*—Raymond L. Owens

(57) ABSTRACT

A method for representing an extended color gamut digital image on a hard-copy output medium having a limited color gamut comprising the steps of adjusting the color values of the extended color gamut digital image to fit within the limited color gamut of the output medium to form a limited color gamut digital image, producing a limited color gamut output print from the limited color gamut digital image on the hard-copy output medium, determining a residual image representing a difference between the extended color gamut digital image and the limited color gamut digital image, and encoding the residual image on the output print using a digital encoding means such that the residual image and the limited color gamut output print are adapted to be used to form a reconstructed extended color gamut digital image.

54 Claims, 4 Drawing Sheets

U.S. PATENT DOCUMENTS

| | | | |
|---|---|---|---|
| 6,305,770 B1 * | 10/2001 | Silverbrook | 347/2 |
| 6,344,900 B1 * | 2/2002 | Hidaka | 358/1.9 |
| 6,430,376 B1 * | 8/2002 | Yamamoto | 396/429 |
| 6,529,288 B1 * | 3/2003 | Miyazaki | 358/1.16 |
| 6,748,106 B1 * | 6/2004 | Bryant et al. | 382/162 |

FOREIGN PATENT DOCUMENTS

| | | |
|---|---|---|
| EP | 0880071 | 11/1998 |
| EP | 0926552 | 6/1999 |
| EP | 1014171 | 6/2000 |

* cited by examiner

METHOD FOR RECORDING A DIGITAL IMAGE AND INFORMATION PERTAINING TO SUCH IMAGE ON AN ORIENTED POLYMER MEDIUM

CROSS REFERENCE TO RELATED APPLICATIONS

Reference is made to commonly assigned U.S. patent application Ser. No. 09/537,064, filed Mar. 28, 2000 to Robert C. Bryant et al., the disclosure of which is incorporated herein by reference.

FIELD OF THE INVENTION

The present invention relates to the field of recording images on a medium and, more particularly, to recording an image and information pertaining to such image on a medium which is highly durable and long lasting.

BACKGROUND OF THE INVENTION

In digital imaging systems, it is frequently desirable to produce hard-copy prints of a digital image. Such hard-copy prints will be limited to the range of colors and tones that can be produced on the particular device and output medium used to produce the image. This range of colors and tones that can be produced on the particular device and output medium is commonly referred to as the color gamut. In many cases, the range of colors that may be present in an original digital image may be significantly larger than the color gamut of the hard-copy print. As a result, information must be discarded in the process of producing the hard-copy print. For example, if the image contains a highly saturated blue sky that is more colorful than any blue that can be produced on the hard-copy print, the color of the blue sky must be clipped to fit within the color gamut of the hard-copy print. Likewise, an original image may also contain a luminance dynamic range (range of brightnesses) that is larger than that which can be produced on the hard-copy print. Therefore, the brightness values in the original image would need to be clipped, or otherwise compressed, to fit within the luminance dynamic range of the hard-copy print.

One example of particular importance is for images, which originate on photographic negatives. This image capture means is capable of capturing a particularly large luminance dynamic range and color gamut. Some color negative systems can capture a scene luminance dynamic range of 8,000:1 or more. Typical hard-copy prints made from photographic negatives can only retain the information from a scene luminance dynamic range of about 100:1 or less. As a result, a large amount of information must be discarded in the process of producing the hard-copy print.

For example, consider the case where a photograph is taken of a person in a dimly lit room sitting in front of brightly lit window. The photographic negative has sufficient luminance dynamic range to record both the indoor part of the scene and the outdoor part of the scene. However, when a hard-copy print is produced, it is necessary to select which portion of the luminance dynamic range should be printed. A print can be made where the indoor part of the scene is well exposed, or alternatively, a print can be made where the outdoor part of the scene is well exposed. When photographic prints are produced, an automatic algorithm is typically used to guess at which part of the scene is most important and to adjust the exposure accordingly. However, many times the algorithm may guess incorrectly. In this case, the only recourse is to have another print made from the original photographic negative where the printing parameters are adjusted appropriately to properly expose the important parts of the scene.

However, a problem with this approach is that the original photographic negatives may be discarded or lost, or may be very difficult to find. As a result, it is not always possible to retrieve the extended color gamut information from the negative. In this case, it is generally not possible to make a significantly improved image from the hard-copy print alone since it does not retain any of the extended color gamut information beyond that which can be produced on the hard-copy print.

Another case where the limited color gamut of a hard-copy print can cause serious restrictions is for hard-copy images produced from digital images that are stored in a color space other than a color space specifically associated with the hard-copy output device. For example, many digital images may be stored in, or may originate in, a video RGB color space. FIG. 1 shows a comparison of a typical video RGB color gamut 10 and a typical hard-copy print color gamut 12. In this case, $a^*$-$b^*$ cross-sections of the color gamuts are shown in the CIELAB space at an $L^*$ of 65. The colors that are inside the boundary are within the gamuts of the respective devices, while those that are outside the boundary cannot be reproduced, and are therefore referred to as "out-of-gamut" colors. It can be seen that there is a large set of color values that are within the video RGB color gamut 10, but are outside the hard-copy print color gamut 12. As a result, if an image in the video RGB color space was used to make a hard copy print, it would not be possible to encode this color information. Therefore, if it were desired at a later time to make a hard-copy print on a different hard-copy output device that had a larger color gamut, it would be impossible to recover the information about the colors that were outside the color gamut of the first hard-copy print.

U.S. Pat. No. 5,841,885 to Neff et al. has disclosed a system and method of storing a digital record which is representative of an image on the print. This approach could be used to store a record of an extended color gamut representation of the image to address the present need. However, a serious shortcoming of the method of U.S. Pat. No. 5,841,885 is that a relatively large amount of information would need to be recorded on the print, thereby making this solution impractical in many cases for storing a full-resolution extended color gamut image.

Another problem with recording digital images on conventional hard copy media is that the images may have a short shelf life and the media may not be durable over an extended period of time. There also remains the problem of providing an extended color gamut of an original scene on a medium that can be utilized, handled and otherwise exposed to environmental conditions by consumers without loss of image information through the degradation of the medium.

SUMMARY OF THE INVENTION

It is an object of the present invention to provide images and information related to such images on a durable medium.

The present invention recognizes that if the medium on which an extended color gamut image is to be formed includes an oriented polymer, a highly desirable and effective print can be produced.

The above object is achieved in a method for recording an image and information pertaining to such image on a output medium, comprising the steps of:

a) providing a medium including an oriented polymer;

b) recording an image on the output medium; and c) producing information pertaining to such image and recording such information pertaining to the image on the output medium.

ADVANTAGES

The present invention has the advantage that the extended color gamut information associated with an original extended color gamut image can be retained on a hard-copy output print having a limited color gamut. This makes it possible to obtain the benefits associated with the original extended color gamut image source without requiring that it be archived separately.

The present invention has the additional advantage that the amount of digital data that must be recorded is substantially smaller than would be required to the entire extended color gamut digital image.

The present invention has the additional advantage that the extended color gamut information can be used, together with the original limited color gamut output print, to produce a reconstructed extended color-gamut digital image that can be used to produce improved output prints.

The present invention has the additional advantage that the extended color gamut information can be used, together with the original limited color gamut output print, to produce an improved image on an output device with a color gamut different than that of the original limited color gamut output print.

The present invention has the additional advantage that the medium that contains both limited and extended color gamut information has exceptional durability with great resistance to tearing and handling abuse, which would deteriorate the image.

The present invention has the additional advantage that the medium that contains both limited and extended color gamut information exhibits exceptional resistance to chemical degradation by environment gases such as oxides of nitrogen, commonly found in urban areas.

The present invention has the additional advantage that the medium that contains both limited and extended color gamut information exhibits exceptional resistance to degradation in image quality caused by exposure to sunlight or other sources of ultraviolet radiation.

DETAILED DESCRIPTION OF THE INVENTION

Figure 1:
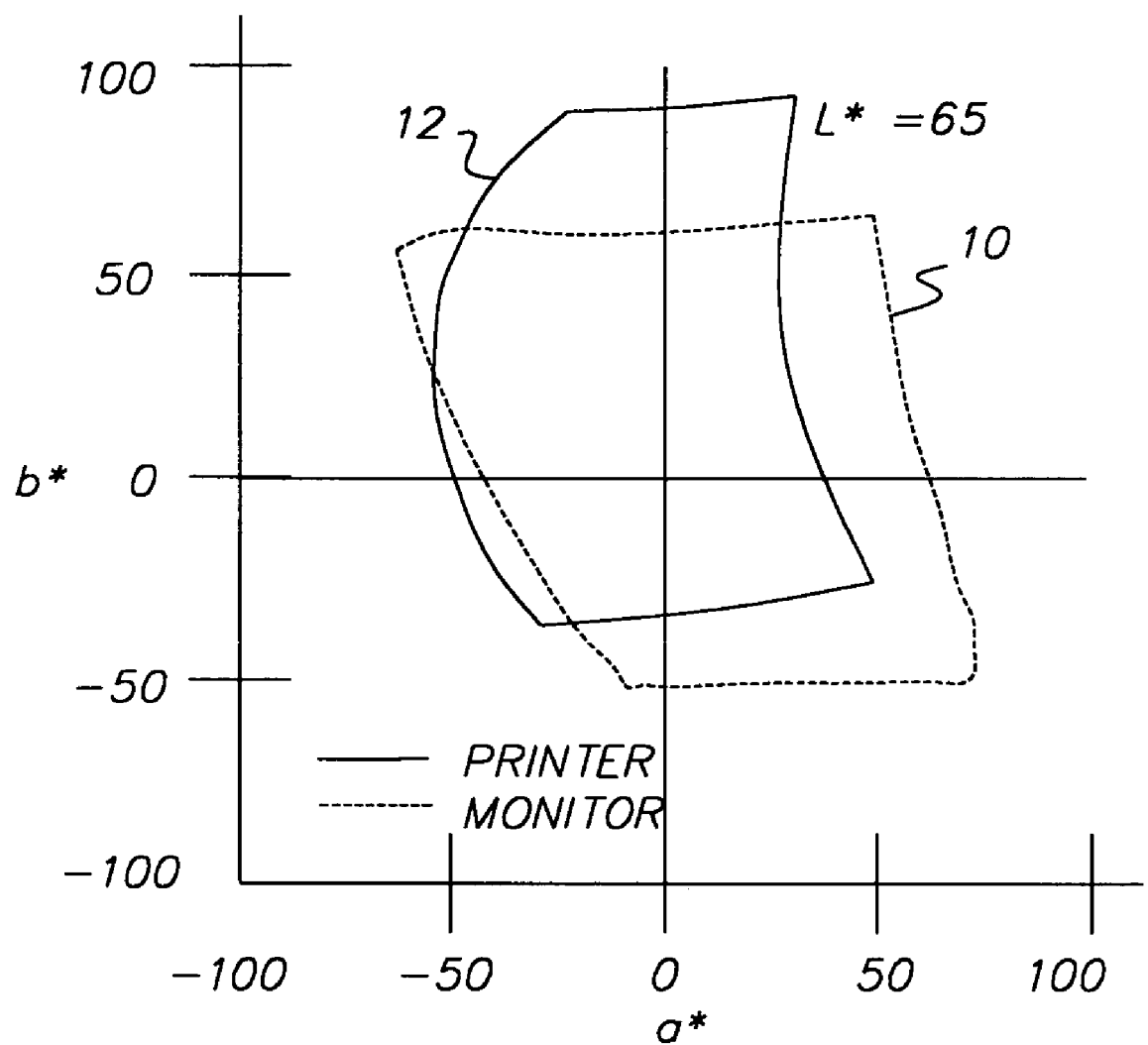
FIG. 1 is graph comparing the color gamuts of a typical video display, and a typical reflection print.

An important feature of the present invention is the recognition that an oriented material can be used in the method of extending the color gamut of a formed image in accordance with the present invention. In attempting to solve the problem of storing additional image information with the hard copy media, a new problem is presented which has to do with retaining all of the image information is encountered. The present invention recognized that it is highly desirable to have the hard copy media to provide a lifetime at least as long as an original photographic negative. However, rather than being capable of safe storage like a photographic negative, hard copy output media is most often exposed to many more environmental conditions because of the desire to display or transport the hard copy image. These environmental conditions may include physical handling, exposure to ultraviolet radiation, and exposure to airborne pollutants such as oxides of nitrogen. Thus, the hard copy media must be much more durable and resistant to environmental exposures than a photographic negative.

The present invention has recognized that to improve the durability of hard copy print media, the material, as set forth in commonly assigned U.S. Pat. No. 5,866,282 to Bourdelais et al., which previously utilized a composite support material with laminated biaxially oriented polyolefin sheets as a photographic imaging material can be used in accordance with the present invention. In commonly assigned U.S. Pat. No. 5,866,282, biaxially oriented polyolefin sheets are extrusion laminated to cellulose paper to create a support for silver halide imaging layers. The biaxially oriented sheets described in commonly assigned U.S. Pat. No. 5,866,282 have a microvoided layer in combination with coextruded layers that contain white pigments. The composite imaging support structure described in commonly assigned U.S. Pat. No. 5,866,282 has been found to be more durable, sharper and brighter than prior art photographic paper imaging supports that use cast melt extruded polyethylene layers coated on cellulose paper.

Indicia applied to an oriented polymer back sheet is disclosed in commonly assigned U.S. Pat. No. 5,874,205 (Bourdelais et al). In commonly assigned U.S. Pat. No. 5,874,205 indicia printed or applied to an oriented polymer sheet is laminated to a base material for use as a photographic output element. However, the media described in these patents does not contain sufficient information to reproduce the extended color gamut of an original scene.

The present invention is concerned with recording digital images and meta-data onto a medium to produce a durable record of both the medium and the meta-data. It will be appreciated that a number of different processes can be used to record digital images and meta-data on the medium. The medium can take a number of different forms well known in the art such as being in a sheet format, or actually being part of the display. Typically, the medium has a plurality of layers (preferably five) with at least one layer that has an oriented polymer. In the following preferred embodiment, an extended color gamut digital image is recorded on the medium. It will be appreciated that the medium has a limited color gamut.

Figure 2:
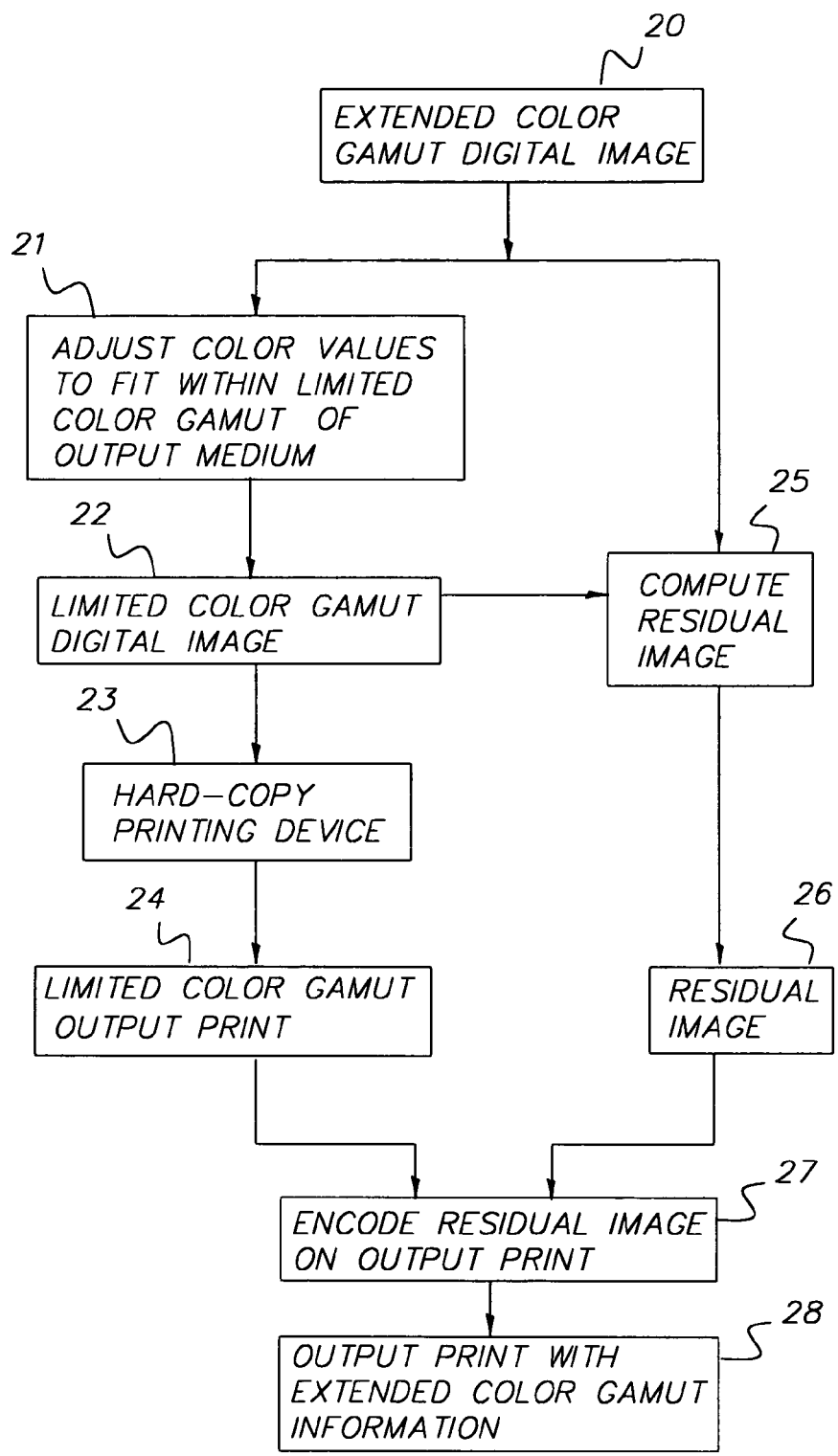
FIG. 2 is a flowchart showing a process for making an output print with extended color gamut information in accordance with the present invention.

The preferred embodiment of the present invention is shown in FIG. 2. An extended color gamut digital image 20 has color values that are outside the limited color gamut of a particular output medium. An adjust color values step 21 is used to limit the color values to those that will fit within the limited color gamut of the particular output medium to form a limited color gamut digital image 22. Next, the limited color gamut digital image is input to a hard-copy printing device 23 to produce a limited color gamut output print 24. A compute residual image step 25 is used to determine a residual image 26 representing the difference between the extended color gamut digital image and the limited color gamut digital image. The residual image 26 is then encoded on the limited color gamut output print 24 using an encode residual image on output print step 27 to produce an output print with extended color gamut information 28.

Each of the aspects of the invention shown in FIG. 2 will now be discussed in more detail. The extended color gamut digital image 20 can take many different forms. For example, the image can be a scanned photographic print, a scanned photographic negative, a scanned photographic transparency, an image from a digital camera, or a computer generated image, etc. Depending on the source of the image, as well as any image processing steps that have been applied to the image, the image may have very different color gamuts and color representations. In particular, images from scanned photographic negatives and digital cameras can contain scene information having a much larger luminance dynamic range than can be represented on many output devices. In this case, luminance dynamic range is simply one aspect of color gamut related to the range of luminance values that can be represented.

The color gamut of an imaging system is the range of colors that can be represented or produced. Since color is fundamentally a three-dimensional phenomenon, color gamuts can be viewed as three-dimensional volumes. Color values that are within the volume are said to be "in-gamut," whereas color values that are outside the volume are said to be "out-of-gamut." One aspect of the color gamut is the luminance dynamic range of the system. This is the range of relative luminance values that can be encoded by the system from the whitest white to the blackest black. Another aspect of the color gamut is the range of chroma values that can be represented from a neutral out to a saturated color. The extended color gamut digital image will generally have a larger luminance dynamic range and a larger range of chroma values than the limited color gamut digital image. The range of chroma values that are in-gamut will generally be a function of hue and lightness. Generally, the highest chroma colors can be produced near the hue and lightness of the primary and secondary colors of a given imaging device or color space (usually red, green, blue, cyan, magenta, and yellow).

If the extended color gamut digital image 20 were a scanned photographic print; the color gamut of the image would generally be the color gamut of the original photographic print medium. Likewise, if the extended color gamut digital image 20 were captured by a digital camera, the color gamut of the image would generally be that of an original scene, although it may be limited by the dynamic range of the camera sensor and by lens flare. The color space that the image is represented in is somewhat independent of the color gamut of the original image. For example, the color values for a scanned photographic print can be represented as raw scanner code values, or they can be given by device independent color values according to a color space such as the CIELAB color space. Alternatively, the color values can be expressed in some other color space.

The adjust color values step 21 is used to adjust the color values of the extended color gamut digital image to fit within the limited color gamut of the output medium, forming a limited color gamut digital image 22. In a preferred embodiment of the present invention, the hard-copy output medium is a silver halide photographic print output medium. The limited color gamut in this case will correspond to the set of colors that can be produced on the photographic print. In this step, information must be discarded when color values that are outside the limited color gamut are mapped to color values within the limited color gamut. In some cases, the color values for the out-of-gamut colors are simply "clipped," i.e., they are mapped to color values on the surface of the limited color gamut. In other cases, more sophisticated gamut mapping methods can be used to compress the extended color gamut into the limited color gamut without introducing a hard clipping function. For example, the chroma of the input color values can be scaled so that the most saturated colors in the extended color gamut are mapped to the most saturated colors in the limited color gamut. Alternatively, a gamut mapping method can be used that is designed to preserve color appearance as closely as possible. Regardless of what gamut mapping technique is used, there will necessarily be a loss of information and a distortion of the color characteristics of the image.

In many cases, the extended color gamut will contain color values that have higher chroma values than can be represented in the limited color gamut. In some cases, the extended color gamut may also have a larger luminance dynamic range than can be represented in the limited color gamut. In the case where it is necessary to reduce the luminance dynamic range of the image, one part in the implementation of the adjust color values step 21 is typically the application of a tone scale function. The tone scale function might be applied to a luminance channel of the image, or alternatively to each color channel of an RGB color representation. In some applications, the image being processed may actually be a monochrome image, e.g., a black-and-white image. In this case, the tonescale function would be applied to the image luminance values.

For cases where the extended color gamut digital image is a representation of the colors in an original scene, the adjust color values step 21 will typically involve determining aim reproduced color values that will produce a desirable reproduction on the particular hard-copy output medium. The process of transforming the original scene color values into aim reproduced color values is sometimes referred to as "rendering" the image.

Once the limited color gamut digital image 22 has been determined, the next step is to print the limited color gamut digital using a hard-copy printing device 23 to produce a limited color gamut output print 24. It may be necessary to use some sort of color calibration or color management technique to determine the appropriate control signal values for the hard-copy printing device 23 corresponding to the code values of the limited color gamut digital image 22.

A compute residual image step 25 is used to determine a residual image 26 representing the difference between the extended color gamut digital image 20 and the limited color gamut digital image 22. In its simplest form, the residual image can be calculated by simply subtracting the adjusted color values of the limited color gamut digital image 22 from the input color values of the extended color gamut digital image 20. The residual image would then be in terms of the color space used to represent those color values. Alternatively, the color values can be transformed into some other space that would be useful for computing the residual image. For example, it might be desirable to compute the residual image in a color space that is well-suited for compressing the residual image or that is convenient for use in reconstructing the extended color gamut digital image. Generally, the extended color gamut digital image 20 and the limited color gamut digital image 22 should be represented in the same color space before the residual image is calculated so that the in-gamut colors will be given by zero residual errors. Since most images will only have a small fraction of color values that are out of gamut, the residual image will be dominated by zeros, and therefore will be highly compressible.

For cases where the adjust color values step 21 involves the application of a transform that modifies the color values for the colors within the limited color gamut as well as those outside the limited color gamut, a residual image determined by directly computing the difference between the input color values of the extended color gamut digital image 20 and the adjusted color values of the limited color gamut digital image 22 would have a large number of non-zero values. This could be undesirable for cases where the residual image is to be compressed. The prior example where the extended color gamut digital image 20 is a representation of the original scene, and the adjust color values step 21 includes rendering the color values to determine desirable color values for a target output device, will generally suffer from this problem. In this case, it can be desirable to apply a second rendering function to the extended color gamut digital image to determine a second set of rendered color values that are desirable for another output device having a larger color gamut than the first target output device. If the second rendering function were identical to the first rendering function throughout most of the color gamut, then a residual image computed by taking the difference between the first and second rendered images would again be largely dominated by zero differences. In one preferred embodiment of the present invention, the first rendering function produces a rendered image that is optimized for the particular hard-copy output medium, and the second rendering function produces a rendered image that is optimized for some hypothetical output device having an idealized large color gamut.

Once the residual image 26 has been calculated, an encode residual image on output print step 27 is applied. Generally, it will be desirable to apply a data compression technique to the residual image to reduce the amount of digital data that needs to be encoded on the limited color gamut output print. For example, the well known JPEG compression technique could be used. Alternatively, a lossless compression technique could be used such as a run-length encoding method.

There are many different types of suitable digital encoding means. One example of a digital encoding means is to incorporate magnetic recording particles in an element on the surface of the hard-copy output medium. In this case, a digital record is made using a magnetic write head, which writes digital information onto a magnetic layer on the print. The magnetic layer would typically be on either the front or rear surface of the print, or along the border of the print. If a magnetic layer were used on the front surface of the print, it would be desirable for the layer to be photographically transparent using means as exemplified in U.S. Pat. No. 5,229,259 which discloses a silver halide photographic material comprising both a silver halide emulsion layer as well as transparent magnetic recording layer.

Another example of a digital encoding means is to represent the bits of the residual image using a machine readable code that is substantially invisible. This can be accomplished using inks, pigments or dyes that absorb and/or fluoresce in the infrared or ultraviolet regions of the electromagnetic spectrum using means as exemplified in U.S. Pat. Nos. 5,542,971 and 5,514,860. U.S. Pat. No. 5,542,971 to Auslander et al. discloses bar codes using luminescent invisible inks and U.S. Pat. No. 5,514,860 to Berson discloses transparent materials imprinted with inks visible only in the infrared portion of the electromagnetic spectrum. The inks, pigments or dyes can be incorporated into the output medium, for example, as an additional layer in a silver halide photographic paper. Alternatively, the inks, pigments or dyes can be applied to the surface of the output medium using techniques such as ink jet printing.

Another example of a digital encoding means is to use a digital data embedding technique to embed digital data within a source image in a manner, which is substantially invisible to a human observer. This is exemplified in U.S. Pat. No. 5,859,920 to Daly et al. which discloses a method comprising the following steps: a) generating a multi-level data image representing the digital data; b) convolving the multi-level data image with an encoding carrier image to produce a frequency dispersed data image; and c) adding the frequency dispersed image to the source image to produce a source image containing embedded data.

Yet another example of a digital encoding means is to use a visible modulation code on the rear surface of the limited color gamut output print. Examples of such modulation codes are the 2D symbologies marketed as Paperdisk™ by Cobblestone Software of Lexington, Mass. and DataGlyph™ by the Xerox Corporation of Stamford, Conn. respectively.

Another type of digital encoding means is to use a passive transponder. This approach is exemplified in the TIRIS Tag-It technology marketed by Texas Instruments Incorporated of Dallas, Tex.

An alternative to storing the full residual image data using the digital encoding means, is instead to store the residual image in a remote location, and then to store information about the location of the residual image on the output print using the digital encoding means. For example, the residual image could be stored on a network server, and the address of the stored residual image could be encoded on the output print using the digital encoding means. When it is desired to access the stored residual image, the information about the location of the residual image can be extracted from the output print, and the corresponding residual image can be accessed from the network server. This has the advantage that the amount of information that must be stored on the output print is reduced. Alternatively, the residual image could be stored in a central image data storage location, or using a transportable digital storage media such as a CDROM or a magnetic disk.

It will be obvious to one skilled in the art that there are many other types of digital encoding means, which could be used, consistent with the present invention.

Figure 3:
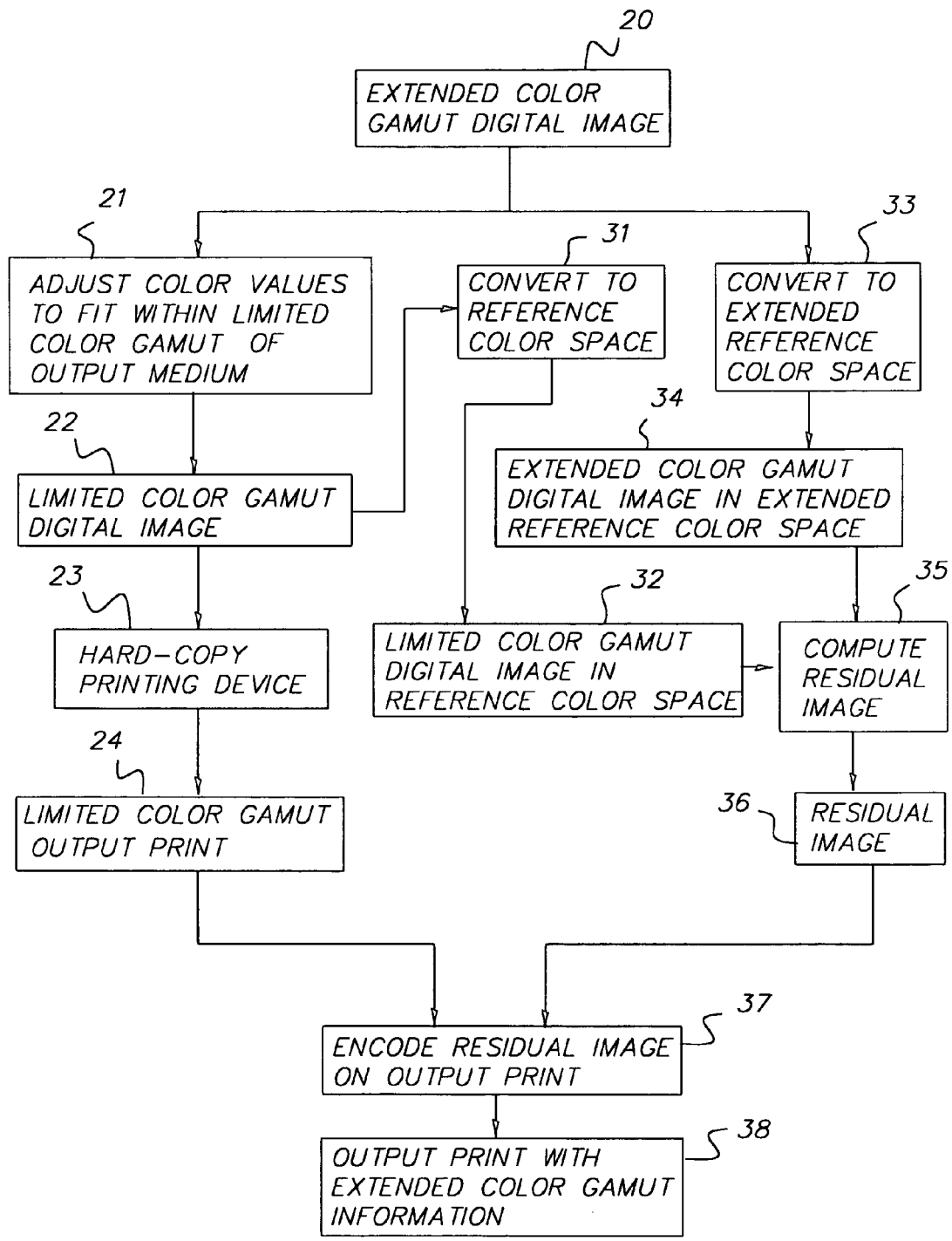
FIG. 3 is a flowchart showing a second process for making an output print with extended color gamut information in accordance with the present invention.

A second preferred embodiment of the present invention is shown in FIG. 3. This embodiment is similar to that shown in FIG. 2 but differs in the way that the residual image is determined. Where elements in this figure are common with those in FIG. 2, identical reference elements have been used. In this second embodiment, an extended color gamut digital image 20 has color values that are outside the limited color gamut of a particular output medium. An adjust color values step 21 is used to limit the color values to those that will fit within the limited color gamut of the particular output medium to form a limited color gamut digital image 22. Next, the limited color gamut digital image is input to a hard-copy printing device 23 to produce a limited color gamut output print 24. A convert to reference color space step 31 is then used to convert the limited color gamut digital image 22 to a reference color space forming a limited color gamut digital image in reference color space 32. The extended color gamut digital image 20 is converted to an extended version of the reference color space using a convert to extended reference color space step 33 forming an extended color gamut digital image in extended reference color space 34. Next a compute residual image step 35 is used to determine a residual image 36 representing the difference between the extended color gamut digital image in extended reference color space 34 and the limited color gamut digital image in reference color space 32. The residual image 36 is then encoded on the limited color gamut output print 24 using an encode residual image on output print step 37 to produce an output print with extended color gamut information 38.

Since most of the steps in this second embodiment of the invention are identical to the corresponding steps in the first embodiment, only the steps that differ will be discussed in more detail. The primary difference between the two embodiments is that the residual image is computed relative to a particular reference color space. Both the limited color gamut digital image 22 and the extended color gamut digital image 20 are converted to the same basic color space, although an extended version of the color space may be required to encode the extended color gamut digital image. Since the same basic color space is used in both cases, the residual image values for the in-gamut portions of the image will be substantially zero, and will therefore be highly compressible. The reference color space could be a device-independent color space such as the well-known CIELAB, or it could be any particular device-dependent color space.

The result of applying the method of the present invention is the creation of both a limited color gamut output print and an associated residual image which can be used to form a reconstructed extended color gamut digital image. The information that normally would have been discarded when the limited color gamut output print was created has now been stored in the residual image and is available for use by systems that are enabled to utilize it.

Figure 4:
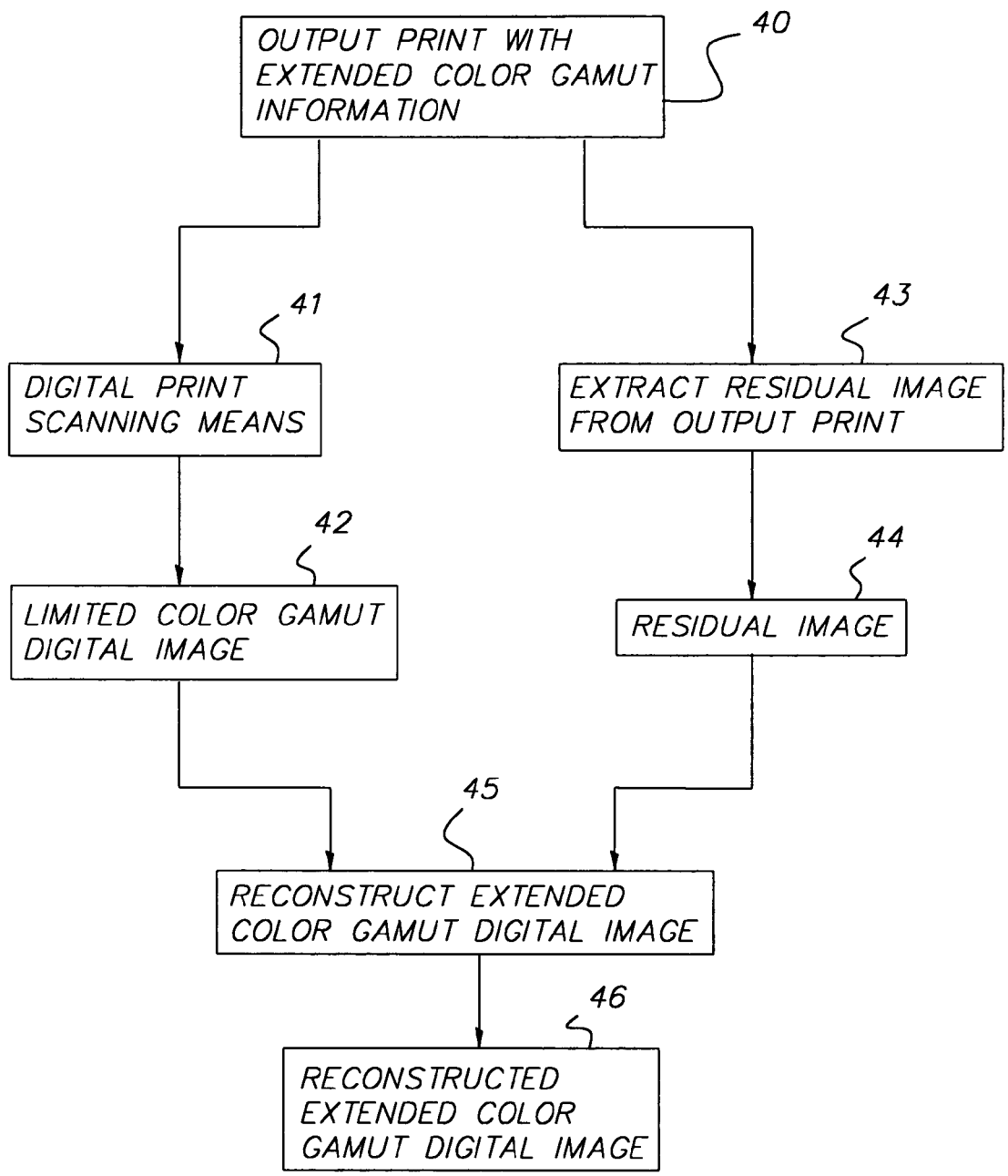
FIG. 4 is a flowchart showing the reconstruction of an extended gamut digital image from an output print with extended color gamut information.

FIG. 4 shows an example process that can be used to form a reconstructed extended color gamut digital image. The input to this process is an output print with extended color gamut information 40 created using the method as described above. A digital print scanning means 41 is used to scan the output print with extended color gamut information 40 to determine a limited color gamut digital image 42. An extract residual image from output print step 43 is used to recover the digitally encoded residual image from the output print. The details of this step will be dependent on the particular digital encoding means that was used to store the residual image. For example, if a magnetic recording element were used to store the residual image data, a magnetic playback means would be used to read the digital data. A reconstruct extended color gamut digital image step 45 is then used to form a reconstructed extended color gamut digital image 46 by combining the limited color gamut digital image 42 and the residual image 44. Typically, the reconstruct extended color gamut digital image step 45 will involve combining the limited color gamut digital image 42 and the residual image 44. If the limited color gamut digital image 42 determined by the digital print scanning means 41 is not in the same color space that was used when the residual image 44 was originally determined, then it will generally be necessary to convert the limited color gamut digital image 42 to this color space before it can be combined with the residual image 44.

The reconstructed extended color gamut digital image can be used for many different purposes. For example, it can be used to form a digital image appropriate for display on an output device having a color gamut different from the limited color gamut of the hard-copy output medium. This enables the generation of an optimal print from the original extended color gamut digital image, rather than a print limited by the constraints of the original output medium.

Alternatively, the information in the reconstructed extended color gamut digital image can be used during the process of applying a modification to the digital image. For example, consider the case where the original image is determined to be over-exposed. In this case, the highlights of the limited color gamut digital image would have been clipped during the adjust color values step. However, the highlight information would be restored in the reconstructed extended color gamut digital image. This information can then be used to produce a modified digital image that retains the highlight detail. Modifications to the digital image can be interactively specified by a user, such as in the case of a user adjustable lightness knob. Modifications can also be determined by applying an automatic algorithm to the digital image. For example, a "scene balance algorithm" can be used to estimate the best color balance and lightness level for an image.

A computer program product having a computer readable storage medium can have a computer program stored thereon for performing many of the steps of the present invention.

A computer program product may include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for practicing a method according to the present invention.

The preferred medium for providing durability and longevity of the image and meta-data is as noted above, an oriented polymer. The terms as used herein, "top", "upper", "emulsion side", and "face" mean the side or toward the side of a photographic member bearing the imaging layers. The terms "bottom", "lower side", and "back" mean the side or toward the side of the photographic member opposite from the side bearing the photosensitive imaging layers or developed image. Although the present invention as described here is directed to a photographic element, it will be understood that other elements such as ink receiving elements, thermal sensitive media, or electrophotographic can also be used with the invention.

By combining the ability to store additional gamut information with a support material that is tough and durable, the lifetime of the gamut information is extended compared to prior art low strength polymer extruded cellulose paper. Further, by laminating tough, durable oriented polymer sheets to cellulose paper, gamut information storage can be improved as the biaxially oriented sheets of the invention can be coated with magnetic coatings for information storage.

The oriented polymer useable in accordance with the present invention can take a number of different forms. For example, it can be a biaxially oriented polymer. Two types of biaxially oriented polymers that are particularly effective are polyolefin and polyester. The present invention makes use of a medium, which preferably is in the form of a sheet. The sheet can include a substrate and one or more layers that has a biaxially oriented polymer.

The layers of a biaxially oriented polyolefin sheet of this invention have levels of voiding, $TiO_2$, optical brightener, and colorants adjusted to provide optimum optical properties for image sharpness, lightness, and opacity. An important aspect of this invention is the voided polymer layer under the silver halide image layer. The microvoided polymer layer provides an improvement over prior art photographic bases for opacity, sharpness, and lightness without the use of expensive white pigments. The biaxially oriented polyolefin sheet is laminated to a cellulose paper base for stiffness for efficient image processing, as well as consumer product handling. Lamination of high strength biaxially oriented polyolefin sheets to the paper significantly increases the tear resistance of the photographic element compared to present photographic paper. The biaxially oriented sheets are preferably laminated with an ethylene metallocene plastomer that allows for lamination speeds exceeding 500 meters/min and optimizes the bond between the paper base and the biaxially oriented polyolefin sheets.

The cellulose paper base utilized in the invention has a surface that is substantially free of undesirable orange peel roughness, which interferes with the viewing of images by the consumer. During lamination it has been found that the biaxially oriented polyolefin sheet replicates the surface of the paper base very well compared to the prior art practice of melt extrusion coating of polyethylene onto the paper base. The orange peel in the paper base is significantly reduced compared to prior art photographic paper bases by rewetting the surface of the paper prior to final calendaring, increasing fiber refining, and decreasing the fiber length. The cellulose paper base also has a machine direction to cross direction stiffness ratio of 1.7. This may be compared to prior art photographic paper bases, which have a typical ratio of 2.2. The reduction in the machine direction to cross direction ratio, combined with the strength properties of the biaxially oriented sheets, allows for a stiffness balanced photographic element where the stiffness in the machine direction is roughly the same as the stiffness in the cross direction. Present photographic paper machine direction stiffness is typically 200% of the cross direction stiffness. A photographic element with a balanced stiffniess is perceptually preferred over present photographic papers.

The biaxially oriented sheets used in the invention contain an integral emulsion bonding layer, which avoids the need for expensive priming coatings or energy treatments. The bonding layer used in the invention is a low density polyethylene skin on the biaxially oriented sheet. Gelatin based silver halide emulsion layers of the invention have been shown to adhere well to low density polyethylene. The integral bonding skin layer also serves as a carrier for the blue tints that correct for the native yellowness of the gelatin based silver halide image element. Concentrating the blue tints in the thin, skin layer reduces the amount of expensive blue tint materials when compared to prior art photographic papers that contain blue tint materials dispersed in a single thick layer of polyethylene.

The backside of the photographic element is laminated with a biaxially oriented sheet to reduce humidity image curl. There are particular problems with prior art color papers when they are subjected to extended high humidity storage such as at greater than 50% relative humidity. The high strength biaxially oriented sheet on the backside resists the curling forces, producing a much flatter image. The biaxially oriented sheet on the back has roughness at two frequencies to allow for efficient conveyance through photographic processing equipment and improved consumer writability as consumers add personal information to the backside of photographic paper with pens and pencils. The biaxially oriented sheet also has an energy to break of $4.0 \times 10$ joules per cubic meter to allow for efficient chopping and punching of the photographic element during photographic processing of images.

Because the support materials of the invention are superior to prior art photographic base materials, the support materials utilized in this invention also are superior base materials for digital imaging technology other than silver halide products. By coating digital printing ink or dye receiver layers on the top of the support materials utilized in the invention, image quality and image durability can be improved over prior art materials. Examples of suitable digital imaging ink or dye receiver layer technology include ink jet printing receiver layers, thermal dye transfer receiving layers, and electrophotographic receiving layers.

Any suitable biaxially oriented polyolefin sheet may be used for the sheet on the top side of the laminated base utilized in the invention. Microvoided composite biaxially oriented sheets are preferred and are conveniently manufactured by coextrusion of the core and surface layers, followed by biaxial orientation, whereby voids are formed around void-initiating material contained in the core layer. Such composite sheets are disclosed in U.S. Pat. Nos. 4,377,616; 4,758,462; and 4,632,869.

The core of the preferred composite sheet should be from 15 to 95% of the total thickness of the sheet, preferably from 30 to 85% of the total thickness. The nonvoided skin(s) should thus be from 5 to 85% of the sheet, preferably from 15 to 70% of the thickness.

The density (specific gravity) of the composite sheet, expressed in terms of "percent of solid density", is calculated as follows:

$$\frac{\text{Composite Sheet Density}}{\text{Polymer Density}} \times 100 = \% \text{ of Solid Density}$$

Percent solid density should be between 45% and 100%, preferably between 67% and 100%. As the percent solid density becomes less than 67%, the composite sheet becomes less manufacturable due to a drop in tensile strength and it becomes more susceptible to physical damage.

The total thickness of the composite sheet can range from 12 to 100 μm, preferably from 20 to 70 μm. Below 20 μm, the microvoided sheets may not be thick enough to minimize any inherent non-planarity in the support and would be more difficult to manufacture. At thickness higher than 70 μm, little improvement in either surface smoothness or mechanical properties is seen, and so there is little justification for the further increase in cost for extra materials.

A preferred material is a biaxially oriented polyolefin sheet that is coated with high barrier polyvinylidene chloride in a range of coverage 1.5 to 6.2 $g/m^2$.

Polyvinyl alcohol can also be used but is less effective under high relative humidity conditions. Through the use of at least one of these materials in combination with a biaxially oriented sheet and a polymer tie layer, it has been shown that improved rates of emulsion hardening can be achieved. In said photographic or imaging element, the water vapor barrier can be achieved by integrally forming said vapor barrier by coextrusion of the polymer(s) into at least one or more layers and then orienting the sheet by stretching it in the machine direction and then the cross direction. The process of stretching creates a sheet that is more crystalline and has better packing or alignment of the crystalline areas. Higher levels of crystallinity results in lower water vapor transmissions rates which, in turn, results in faster emulsion hardening. The oriented sheet is then laminated to a paper base.

The control of water vapor transmission can be provided by any layer independently such as the tie layer or the biaxially oriented polyolefin sheet or in combination with each other. With the incorporation of other layer(s) that are integrally formed with, applied to, or bonded with the polyolefin sheet, the water vapor transmission rate can be adjusted to achieve the desired photographic or imaging results. One or more of the layers comprising the polyolefin sheet tie layer combinations may contain $TiO_2$ or other inorganic pigment. In addition, one or more of the layers comprising the polyolefin sheet may be voided. Other materials that can be used to enhance the water vapor transmission characteristics comprise at least one material from the group consisting of polyethylene terephthalate, polybutylterephthalate, acetates, cellophane polycarbonates, polyethylene vinyl acetate, ethylene vinyl acetate, methacylate, polyethylene methylacrylate, acrylates, acrylonitrile, polyester ketone, polyethylene acrylic acid, polychlorotrifluoroethylene, polychlorotrifluoroethylene, polytetrafluoroethylene, amorphous nylon, polyhydroxyamide ether, and metal salt of ethylene methacrylic acid copolymers.

An imaging medium such as an element that can be used in accordance with the present invention includes a paper base substrate, at least one photosensitive silver halide layer, a layer of biaxially oriented polymer sheet between said paper base and said silver halide layer, and at least one polymer layer between said biaxially oriented polymer sheet and said paper base which binds the two together, wherein between the paper and the opaque layers of said biaxially oriented sheet, there is located at least one oxygen barrier layer having less than 2.0 cc/m$^2$·hr·atm (20° C., dry state) oxygen transmission rate may be formed in one embodiment. The terms used herein, "bonding layer", "adhesive layer", and "adhesive" mean the melt extruded resin layer between the biaxially oriented polyolefin sheets and the base paper; "oxygen impermeable layer" and "oxygen barrier layer" refer to the layer having oxygen permeability of not more than 2.0 cc/m$^2$·hr·atm according to the method defined in ASTM D-1434-63 when the layer is measured on its own as a discrete sample.

In one embodiment of this invention it has been shown that when an oxygen barrier of at least 2.0 cc/m$^2$ hr atm is provided as an integral part of the biaxially oriented sheet, improved fade performance is achieved after exposure to light fade conditions. In one embodiment of this invention, said barrier layer is ethylene vinyl alcohol, and in another more preferred embodiment is polyvinyl alcohol. Additionally it has been shown that the application of an aliphatic polyketone polymer between the emulsion and the photographic paper base forms an oxygen barrier of about 2.0 cc/m$^2$. It is further demonstrated that an imaging element with an integral layer comprising one member selected from the group consisting of homo- and co-polymers of acrylonitrile, alkyl acrylates such as methyl acrylate, ethyl acrylate, and butyl acrylate, alkyl methacrylates such as methyl methacrylate and ethyl methacrylate, methacrilonitrile, alkyl vinyl esters such as vinyl acetate, vinyl proprionate, vinyl ethyl butyrate and vinyl phenyl acetate, alkyl vinyl ethers such as methyl vinyl ether, butyl vinyl ether and chloroethyl vinyl ether, vinyl alcohol, vinyl chloride, vinylidene chloride, vinyl fluoride, styrene and vinyl acetate (in the case of copolymers, ethylene and/or propylene can be used as comonomers), cellulose acetates such as diacetyl cellulose and triacetyl cellulose, polyesters such as polyethylene terephthalate, a fluorine resin, polyamide (nylon), polycarbonate, polysaccharide, aliphatic polyketone, blue dextran, and cellophane with an oxygen transmission at equal to or less than 2.0 cc/m$^2$ hr atm. provides improved performance for dye fade.

"Void" is used herein to mean devoid of added solid and liquid matter, although it is likely the "voids" contain gas. The void-initiating particles which remain in the finished packaging sheet core should be from 0.1 to 10 µm in diameter and preferably round in shape to produce voids of the desired shape and size. The size of the void is also dependent on the degree of orientation in the machine and transverse directions. Ideally, the void would assume a shape which is defined by two opposed and edge contacting concave disks. In other words, the voids tend to have a lens-like or biconvex shape. The voids are oriented so that the two major dimensions are aligned with the machine and transverse directions of the sheet. The Z-direction axis is a minor dimension and is roughly the size of the cross diameter of the voiding particle. The voids generally tend to be closed cells, and thus there is virtually no path open from one side of the voided-core to the other side through which gas or liquid can traverse.

The photographic element of this invention generally has a glossy surface, that is, a surface that is sufficiently smooth to provide excellent reflection properties. Prior art photographic paper uses polyethylene cast against a rough chill roll to create nonglossy surfaces. It has been found that by controlling the voiding process in the biaxially oriented sheets, an opalescent surface can be created. An opalescent surface may be preferred because it provides a unique photographic appearance to a reflective paper that is perceptually preferred by youth, children, and when utilized as an advertising media. The opalescent surface is achieved when the microvoids in the vertical direction are between 1 and 3 µm. By the vertical direction, it is meant the direction that is perpendicular to the plane of the imaging member. The thickness of the microvoids preferably is between 0.7 and 1.5 µm for best physical performance and opalescent properties. The preferred number of microvoids in the vertical direction is between 8 and 30. Less than 6 microvoids in the vertical direction do not create the desired opalescent surface. Greater than 35 microvoids in the vertical direction do not significant improve the optical appearance of the opalescent surface.

The void-initiating material may be selected from a variety of materials and should be present in an amount of about 5 to 50% by weight based on the weight of the core matrix polymer. Preferably, the void-initiating material comprises a polymeric material. When a polymeric material is used, it may be a polymer that can be melt-mixed with the polymer from which the core matrix is made and be able to form dispersed spherical particles as the suspension is cooled down. Examples of this would include nylon dispersed in polypropylene, polybutylene terephthalate in polypropylene, or polypropylene dispersed in polyethylene terephthalate. If the polymer is preshaped and blended into the matrix polymer, the important characteristic is the size and shape of the particles. Spheres are preferred and they can be hollow or solid. These spheres may be made from cross-linked polymers which are members selected from the group consisting of an alkenyl aromatic compound having the general formula Ar—C(R)=CH$_2$, wherein Ar represents an aromatic hydrocarbon radical, or an aromatic halohydrocarbon radical of the benzene series and R is hydrogen or the methyl radical; acrylate-type monomers include monomers of the formula $CH_2=C(R')-C(O)(OR)$ wherein R is selected from the group consisting of hydrogen and an alkyl radical containing from about 1 to 12 carbon atoms and R' is selected from the group consisting of hydrogen and methyl; copolymers of vinyl chloride and vinylidene chloride, acrylonitrile and vinyl chloride, vinyl bromide, vinyl esters having formula $CH_2=CH(O)COR$, wherein R is an alkyl radical containing from 2 to 18 carbon atoms; acrylic acid, methacrylic acid, itaconic acid, citraconic acid, maleic acid, fumaric acid, oleic acid, vinylbenzoic acid; the synthetic polyester resins which are prepared by reacting terephthalic acid and dialkyl terephthalics or ester-forming derivatives thereof, with a glycol of the series $HO(CH_2)_nOH$ wherein n is a whole number within the range of 2–10 and having reactive olefinic linkages within the polymer molecule, the above-described polyesters which include copolymerized therein up to 20 percent by weight of a second acid or ester thereof having reactive olefinic unsaturation and mixtures thereof, and a cross-linking agent selected from the group consisting of divinylbenzene, diethylene glycol dimethacrylate, diallyl fumarate, diallyl phthalate, and mixtures thereof.

Examples of typical monomers for making the cross-linked polymer void initiating particles include styrene, butyl acrylate, acrylamide, acrylonitrile, methyl methacrylate, ethylene glycol dimethacrylate, vinyl pyridine, vinyl acetate, methyl acrylate, vinylbenzyl chloride, vinylidene chloride, acrylic acid, divinylbenzene, acrylamidomethyl-propane sulfonic acid, vinyl toluene, etc. Preferably, the cross-linked polymer is polystyrene or poly(methyl methacrylate). Most preferably, it is polystyrene, and the cross-linking agent is divinylbenzene.

Processes well known in the art yield nonuniformly sized void initiating particles, characterized by broad particle size distributions. The resulting beads can be classified by screening the beads spanning the range of the original distribution of sizes. Other processes such as suspension polymerization, limited coalescence, directly yield very uniformly sized particles.

The void-initiating materials may be coated with agents to facilitate voiding. Suitable agents or lubricants include colloidal silica, colloidal alumina, and metal oxides such as tin oxide and aluminum oxide. The preferred agents are colloidal silica and alumina, most preferably, silica. The cross-linked polymer having a coating of an agent may be prepared by procedures well known in the art. For example, conventional suspension polymerization processes wherein the agent is added to the suspension is preferred. As the agent, colloidal silica is preferred.

The void-initiating particles can also be inorganic spheres, including solid or hollow glass spheres, metal or ceramic beads or inorganic particles such as clay, talc, barium sulfate, or calcium carbonate. The important thing is that the material does not chemically react with the core matrix polymer to cause one or more of the following problems: (a) alteration of the crystallization kinetics of the matrix polymer, making it difficult to orient, (b) destruction of the core matrix polymer, (c) destruction of the void-initiating particles, (d) adhesion of the void-initiating particles to the matrix polymer, or (e) generation of undesirable reaction products, such as toxic or high color moieties. The void-initiating material should not be photographically active or degrade the performance of the photographic element in which the biaxially oriented polyolefin sheet is utilized.

For the biaxially oriented sheet on the top side toward the emulsion, suitable classes of thermoplastic polymers for the biaxially oriented sheet and the core matrix-polymer of the preferred composite sheet comprise polyolefins.

Suitable polyolefins include polypropylene, polyethylene, polymethylpentene, polystyrene, polybutylene, and mixtures thereof. Polyolefin copolymers, including copolymers of propylene and ethylene such as hexene, butene, and octene are also useful. Polypropylene is preferred, as it is low in cost and has desirable strength properties.

The nonvoided skin layers of the composite sheet can be made of the same polymeric materials as listed above for the core matrix. The composite sheet can be made with skin(s) of the same polymeric material as the core matrix, or it can be made with skin(s) of different polymeric composition than the core matrix. For compatibility, an auxiliary layer can be used to promote adhesion of the skin layer to the core.

The total thickness of the top most skin layer should be between 0.20 µm and 1.5 µm, preferably between 0.5 and 1.0 µm. Below 0.5 µm any inherent nonplanarity in the coextruded skin layer may result in unacceptable color variation. At skin thickness greater than 1.0 µm, there is a reduction in the photographic optical properties such as image resolution. At thickness greater than 1.0 µm, there is also a greater material volume to filter for contamination such as clumps or poor color pigment dispersion.

Addenda may be added to the topmost skin layer to change the color of the imaging element. For photographic use, a white base with a slight bluish tinge is preferred. The addition of the slight bluish tinge may be accomplished by any process which is known in the art including the machine blending of color concentrate prior to extrusion and the melt extrusion of blue colorants that have been preblended at the desired blend ratio. Colored pigments that can resist extrusion temperatures greater than 320° C. are preferred, as temperatures greater than 320° C. are necessary for coextrusion of the skin layer. Blue colorants used in this invention may be any colorant that does not have an adverse impact on the imaging element. Preferred blue colorants include Phthalocyanine blue pigments, Cromophtal blue pigments, Irgazin blue pigments, and Irgalite organic blue pigments. Optical brightener may also be added to the skin layer to absorb UV energy and emit light largely in the blue region. $TiO_2$ may also be added to the skin layer. While the addition of $TiO_2$ in the thin skin layer of this invention does not significantly contribute to the optical performance of the sheet, it can cause numerous manufacturing problems such as extrusion die lines and spots. The skin layer substantially free of $TiO_2$ is preferred. $TiO_2$ added to a layer between 0.20 and 1.5 µm does not substantially improve the optical properties of the support, will add cost to the design, and will cause objectionable pigments lines in the extrusion process.

Addenda may be added to the core matrix and/or to one or more skin layers to improve the optical properties of the photographic support. Titanium dioxide is preferred and is used in this invention to improve image sharpness or MTF, opacity, and whiteness. The $TiO_2$ used may be either anatase or rutile type. Further, both anatase and rutile $TiO_2$ may be blended to improve both whiteness and sharpness. Examples of $TiO_2$ that are acceptable for a photographic system are DuPont Chemical Co. R101 rutile $TiO_2$ and DuPont Chemical Co. R104 rutile $TiO_2$. Other pigments known in the art to improve photographic optical responses may also be used in this invention. Examples of other pigments known in the art to improve whiteness are talc, kaolin, $CaCO_3$, $BaSO_4$, ZnO, $TiO_2$, ZnS, and $MgCO_3$. The preferred $TiO_2$ type is anatase, as anatase $TiO_2$ has been found to optimize image whiteness and sharpness with a voided layer.

The preferred weight percent of white pigment to be added to the biaxially oriented layers between the photosensitive layer and the voided layer can range from 18% to 24%. Below 15% the optical properties of the voided biaxially oriented sheet do not show a significant improvement over prior art photographic paper. Above 28%, manufacturing problems such as unwanted voiding and a loss of coating speed are encountered. The voided layer may also contain white pigments. The voided layer may contain between 2 and 18% white pigment, preferably between 2% and 8%. Below 2%, the optical properties of the voided biaxially oriented sheet do not show a significant improvement. Above 8%, the voided layer suffers from a loss in mechanical strength which will reduce the commercial value of the photographic support of this invention as images are handled and viewed by consumers.

The layer adjacent and below the voided layer may also contain white pigments of this invention. A layer that is substantially colorant free is preferred, as there is little improvement in the optical performance of the photographic support when colorants are added below the voided layer. The preferred weight percent of white pigment to be added to the biaxially oriented layer below the voided layer can range from 12% to 24%. Below 8% the optical properties of the voided biaxially oriented sheet do not show a significant improvement over prior art photographic paper. Above 28%, manufacturing problems such as unwanted voiding, loss of coating speed, and poor $TiO_2$ dispersions are encountered.

Addenda may be added to the biaxially oriented sheet of this invention so that when the biaxially oriented sheet is viewed from a surface, the imaging element emits light in the visible spectrum when exposed to ultraviolet radiation. Emission of light in the visible spectrum allows for the support to have a desired background color in the presence of ultraviolet energy. This is particularly useful when images are viewed outside as sunlight contains ultraviolet energy and may be used to optimize image quality for consumer and commercial applications.

Addenda known in the art to emit visible light in the blue spectrum are preferred. Consumers generally prefer a slight blue tint to the density minimum areas of a developed image defined as a negative b* compared to a neutral density minimum defined as a b* within one b* unit of zero. b* is the measure of yellow/blue in CIE (Commission Internationale de L'Eclairage) space. A positive b* indicates yellow, while a negative b* indicates blue. The addition of addenda that emits in the blue spectrum allows for tinting the support without the addition of colorants which would decrease the whiteness of the image. The preferred emission is between 1 and 5 delta b* units. Delta b* is defined as the b* difference measured when a sample is illuminated with a ultraviolet light source and a light source without any significant ultraviolet energy. Delta b* is the preferred measure to determine the net effect of adding an optical brightener to the top biaxially oriented sheet of this invention. Emissions less than 1 b* unit cannot be noticed by most customers; therefore, is it not cost effective to add optical brightener to the biaxially oriented sheet when the b* is changed by less than 1 b* unit. An emission greater that 5 b* units would interfere with the color balance of the images making the whites appear too blue for most consumers.

The preferred addenda of this invention is an optical brightener. An optical brightener is a colorless, fluorescent, organic compound that absorbs ultraviolet light and emits it as visible blue light. Examples include, but are not limited to, derivatives of 4,4'-diaminostilbene-2,2'-disulfonic acid, coumarin derivatives such as 4-methyl-7-diethylaminocoumarin, 1–4-Bis (O-Cyanostyryl) Benzol and 2-Amino-4-Methyl Phenol.

Layers below the exposed surface layer in biaxially oriented sheet of the invention may also contain pigments which are known to improve the photographic optical responses such as whiteness or sharpness. Titanium dioxide is used in this invention to improve image sharpness, whiteness, and provide the required level of opacity to the biaxially oriented sheets. The $TiO_2$ used may be either anatase or rutile type. For this invention, rutile is the preferred because the unique particle size and geometry optimize image quality for most consumer applications. Examples of rutile $TiO_2$ that are acceptable for a photographic system are DuPont Chemical Co. R101 rutile $TiO_2$ and DuPont Chemical Co. R104 rutile $TiO_2$. Other pigments to improve image quality may also be used in this invention.

The present invention in a preferred embodiment consists of a multilayer film of biaxially oriented polyolefin which is attached to both the top and bottom of a photographic quality paper support by melt extrusion of a polymer tie layer. The biaxially oriented films that have been used in this invention contain a plurality of layers in which at least one of the layers contains voids. The voids provide added opacity to the imaging element. This voided layer can also be used in conjunction with a layer that contains at least one pigment from the group consisting of $TiO_2$, $CaCO_3$, clay, $BaSO_4$, ZnS, $MgCO_3$, talc, kaolin, or other materials that provide a highly reflective white layer in said film of more than one layer. The combination of a pigmented layer with a voided layer provides advantages in the optical performance of the final image.

Voided layers are more susceptible than solid layers to mechanical failure, such as cracking or delamination from adjacent layers. Voided structures that contain $TiO_2$, or are in proximity to layers containing $TiO_2$, are particularly susceptible to loss of mechanical properties and mechanical failure with long-term exposure to light. $TiO_2$ particles initiate and accelerate the photooxidative degradation of polypropylene. The addition of a hindered amine stabilizer to at least one layer of a multilayer biaxially oriented film and in the preferred embodiment in the layers containing $TiO_2$ and, furthermore, in the most preferred embodiment the hindered amine is in the layer with $TiO_2$, as well as in the adjacent layers, that improvements to both light and dark keeping image stability are achieved.

The film preferably contains a stabilizing amount of hindered amine at or about 0.01 to 5% by weight in at least one layer of said film. While these levels provide improved stability to the biaxially oriented film, the preferred amount at or about 0.1 to 3% by weight provides an excellent balance between improved stability for both light and dark keeping, while making the structure more cost effective.

The hindered amine light stabilizer HALS) may come from the common group of hindered amine compounds originating from 2,2,6,6-tetramethylpiperidine, and the term hindered amine light stabilizer is accepted to be used for hindered piperidine analogs. The compounds form stable nitroxyl radicals that interfere with photooxidation of polypropylene in the presence of oxygen, thereby affording excellent long-term photographic stability of the imaging element. The hindered amine will have sufficient molar mass to minimize migration in the final product, will be miscible with polypropylene at the preferred concentrations, and will not impart color to the final product. In the preferred embodiment, examples of HALS include poly{[6-[(1,1,3,3- tetramethylbutylamino}-1,3,5-triazine-4-piperidinyl)-imino]-1,6-hexanediyl[(2,2,6,6-tetramethyl-4-piperidinyl)imino]} (Chimassorb 944 LD/FL), Chimassorb 119, and bis(1,2,2,6,6-pentamethyl-4-piperidinyl)[3,5-bis(1,1-dimethylethyl-4-hydroxyphenyl)methyl]butylpropanedioate (Tinuvin 144), although they are not limited to these compounds.

In addition, the film may contain any of the hindered phenol primary antioxidants commonly used for thermal stabilization of polypropylene, alone, or in combination with a secondary antioxidants. Examples of hindered phenol primary antioxidants include pentaerythrity tetrakis [3-(3,5-di-tert-butyl-4-hydroxyphenyl)proprionate] (such as Irganox 1010), octadecyl 3-(3,5-di-tert-butyl-4-hydroxyphenyl) proprionate (such as Irganox 1076), benzenepropanoic acid 3,5-bis(1,1-dimethyl)-4-hydroxy-2[3-[3,5-bis(1,1-dimethylethyl)-4-hydroxyphenyl)-1-oxopropyl)hydrazide (such as Irganox MD1024), 2,2'-thiodiethylenebis[3-(3,5-di-tert-butyl-4-hydroxyphenyl)proprionate] (such as Irganox 1035), 1,3,5-trimethyl-2,4,6-tri(3,5-di-tert-butyl-4-hydroxybenzyl)-benzene (such as Irganox 1330), but are not limited to these examples. Secondary antioxidants include organic alkyl and aryl phosphites including examples such as triphenylphosphite (such as Irgastab TPP), tri(n-propylphenylphosphite) (such as Irgastab SN-55), 2,4-bis(1,1-dimethylphenyl) phosphite (such as Irgafos 168), and in a preferred embodiment would include Irgafos 168. The combination of hindered amines with other primary and secondary antioxidants have a synergistic benefit in a multilayer biaxially oriented polymer sheet by providing thermal stability to polymers such as polypropylene during melt processing and extrusion, and further enhancing their light and dark keeping properties which is not evident in a mono layer system for imaging products such as photographs. These unexpected results provide for a broader range of polymers that can be utilized in imaging product, thus enabling enhanced features to be incorporated into their design.

Traditional photographic supports that contain optical brightener generally use anatase $TiO_2$ in combination optical brightener. The use of rutile $TiO_2$, while preferred for image quality, tends to reduce the efficiency of the optical brightener when optical brightener and rutile $TiO_2$ are used in combination. Prior art photographic supports containing optical brightener generally use anatase $TiO_2$ in combination with optical brightener. By concentrating the optical brightener and rutile $TiO_2$ in one functional thin layer, rutile $TiO_2$ does not significantly reduce the efficiency of the optical brightener, allowing for rutile $TiO_2$ and optical brightener to be used together which improve image quality. The preferred location for the $TiO_2$ is adjacent to the exposed layer. This location allows for efficient manufacture of the biaxially oriented coextruded structure, as the $TiO_2$ does not come in contact with exposed extrusion die surfaces.

The optical brightener may be added to any layer in the multilayer coextruded biaxially oriented polyolefin sheet. The preferred location is adjacent to or in the exposed surface layer of said sheet. This allows for the efficient concentration of optical brightener which results in less optical brightener being used when compared to traditional photographic supports. Typically 20% to 40% less optical brightener is required when the optical brightener is concentrated in a functional layer close to the imaging layers.

When the desired weight percentage loading of the optical brightener begins to approach a concentration at which the optical brightener migrates to the surface of the support forming crystals in the imaging layer, the addition of optical brightener into the layer adjacent to the exposed layer is preferred. In prior art imaging supports that use optical brightener, expensive grades of optical brightener are used to prevent migration into the imaging layer. When optical brightener migration is a concern, as with light sensitive silver halide imaging systems, the preferred exposed layer comprises polyethylene that is substantially free of optical brightener. In this case, the migration from the layer adjacent to the exposed layer is significantly reduced because the exposed surface layer acts as a barrier for optical brightener migration allowing for much higher optical brightener levels to be used to optimize image quality. Further, locating the optical brightener in the layer adjacent to the exposed layer allows for a less expensive optical brightener to be used as the exposed layer, which is substantially free of optical brightener, prevents significant migration of the optical brightener. Another preferred method to reduce unwanted optical brightener migration in biaxially oriented sheets of this invention is to use polypropylene for the layer adjacent to the exposed surface. Prior art photographic supports generally use melt extruded polyethylene to provide waterproofing to the base paper. Since optical brightener is more soluble in polypropylene than polyethylene, the optical brightener is less likely to migrate from polypropylene to the exposed surface layer.

A biaxially oriented sheet of this invention which has a microvoided core is preferred. The microvoided core adds opacity and whiteness to the imaging support, further improving imaging quality. Combining the image quality advantages of a microvoided core with a material, which absorbs ultraviolet energy and emits light in the visible spectrum, allows for the unique optimization of image quality, as the image support can have a tint when exposed to ultraviolet energy yet retain excellent whiteness when the image is viewed using lighting that does not contain significant amounts of ultraviolet energy such as indoor lighting.

It has been found that the microvoids located in the voided layer of the top biaxially oriented sheet provide a reduction in undesirable pressure fog. Mechanical pressure, of the order of hundreds of kilograms per square centimeter, causes an undesirable, reversible decrease in sensitivity by a mechanism at the time of writing that is not fully understood. The net result of mechanical pressure is an unwanted increase in density, mainly yellow density. The voided layer in the biaxially oriented sheet absorbs mechanical pressure by compression of the voided layer, common in the converting and photographic processing steps, and reduces the amount of yellow density change. Pressure sensitivity is measured by applying a 206 MPa load to the coated light sensitive silver halide emulsion, developing the yellow layer, and measuring the density difference with an X-Rite model 310 (or comparable) photographic transmission densitometer between the control sample which was unloaded and the loaded sample. The preferred change in yellow layer density is less than 0.02 at a pressure of 206 MPa. A 0.04 change in yellow density is perceptually significant and, thus, undesirable.

The coextrusion, quenching, orienting, and heat setting of these composite sheets may be effected by any process which is known in the art for producing oriented sheet, such as by a flat sheet process or a bubble or tubular process. The flat sheet process involves extruding the blend through a slit die and rapidly quenching the extruded web upon a chilled casting drum so that the core matrix polymer component of the sheet and the skin components(s) are quenched below their glass solidification temperature. The quenched sheet is then biaxially oriented by stretching in mutually perpendicular directions at a temperature above the glass transition temperature and below the melting temperature of the matrix polymers. The sheet may be stretched in one direction and then in a second direction or may be simultaneously stretched in both directions. After the sheet has been stretched, it is heat set by heating to a temperature sufficient to crystallize or anneal the polymers, while restraining to some degree the sheet against retraction in both directions of stretching.

The composite sheet, while described as having preferably at least three layers of a microvoided core and a skin layer on each side, may also be provided with additional layers that may serve to change the properties of the biaxially oriented sheet. A different effect may be achieved by additional layers. Such layers might contain tints, antistatic materials, or different void-making materials to produce sheets of unique properties. Biaxially oriented sheets could be formed with surface layers that would provide an improved adhesion, or look to the support and photographic element. The biaxially oriented extrusion could be carried out with as many as 10 layers if desired to achieve some particular desired property.

These composite sheets may be coated or treated after the coextrusion and orienting process or between casting and full orientation with any number of coatings which may be used to improve the properties of the sheets including printability, to provide a vapor barrier, to make them heat sealable, or to improve the adhesion to the support or to the photosensitive layers. Examples of this would be acrylic coatings for printability and coating polyvinylidene chloride for heat seal properties. Further examples include flame, plasma, or corona discharge treatment to improve printability or adhesion.

This invention has been described in detail with particular reference to certain preferred embodiments thereof, but it will be understood that variations and modifications can be effected within the spirit and scope of the invention.

| PARTS LIST | |
|---|---|
| 10 | video RGB color gamut |
| 12 | reflection print color gamut |
| 20 | extended color gamut digital image |
| 21 | adjust color values |
| 22 | limited color gamut digital image |
| 23 | hard-copy printing device |
| 24 | limited color gamut output print |
| 25 | compute residual image |
| 26 | residual image |
| 27 | encode residual image |
| 28 | output print |
| 31 | convert to reference color space |
| 32 | limited color gamut digital image |
| 33 | convert to extended reference color space |
| 34 | extended color gamut digital image |
| 35 | compute residual image |
| 36 | residual image |
| 37 | encode residual image |
| 38 | output print |
| 40 | output print |
| 41 | digital print scanning means |
| 42 | limited color gamut digital image |
| 43 | extract residual image |
| 44 | residual image |
| 45 | reconstruct extended color gamut digital image |
| 46 | reconstructed extended color gamut digital image |

What is claimed is:

1. A method for recording an image and image information pertaining to such image on a output medium, comprising:
   a) providing the image having the image information, and processing the image to form digital information from the image information;
   b) providing a medium including an oriented polymer;
   c) recording the image on the output medium; and
   d) producing a digital representation of the image information which was not recorded in the image on the output medium and recording the digital representation of the image information on the output medium.

2. The method of claim 1 wherein the oriented polymer includes a polypropylene or polyester.

3. The method of claim 2 wherein the polypropylene or polyester is biaxially oriented.

4. The method of claim 1 wherein the output medium includes at least two layers and each include either biaxially oriented polypropylene or biaxially oriented polyester.

5. The method of claim 1 wherein the output medium includes a hindered amine light stabilizer.

6. The method of claim 5 wherein each layer of the output medium includes a hindered amine light stabilizer.

7. The method of claim 1 wherein the oriented polymer is formed so as to provide voids.

8. A method for recording an extended color gamut digital image on a hard-copy output medium having a limited color gamut comprising:
   a) providing the hard-copy output medium including biaxially oriented polypropylene;
   b) adjusting the extended color gamut digital image to be compatible with the recording properties of the hard-copy output medium; and
   c) recording the adjusted digital image on the hard-copy output medium; and
   d) producing a digital representation of information in the extended color gamut digital image which was not recorded in the adjusted digital image on the hard-copy output medium and recording the digital representation on the hard-copy output medium.

9. A method for recording an extended color gamut digital image on a hard-copy output medium having a limited color gamut, comprising:
   a) providing the hard-copy output medium including an oriented polymer;
   b) adjusting the color of the values extended color gamut digital image to fit within the limited color gamut of the hard-copy output medium to form a limited color gamut digital image;
   c) producing a limited color gamut output print from the limited color gamut digital image on the hard-copy output medium;
   d) determining a residual image representing a difference between the extended color gamut digital image and the limited color gamut digital image; and
   e) recording the residual image on the hard-copy output medium using a digital encoding means such that the residual image and the limited color gamut output print are adapted to be used to form a reconstructed extended color gamut digital image, whereby an improved image is provided on the hard-copy output medium.

10. The method of claim 8 wherein the oriented polymer includes a polypropylene or polyester.

11. The method of claim 9 wherein the polypropylene or polyester is biaxially oriented.

12. The method of claim 8 wherein the hard-copy output medium includes at least two layers and each includes either biaxially oriented polypropylene or biaxially oriented polyester.

13. The method of claim 12 wherein the hard-copy output medium includes a hindered amine light stabilizer.

14. The method of claim 13 wherein each layer of the hard-copy output medium includes a hindered amine light stabilizer.

15. The method of claim 9 wherein the digital encoding means comprises a magnetic recording element on the hard-copy output medium.

16. The method of claim 9 wherein the digital encoding means comprises an invisible encoding means using an infrared absorbing ink, pigment or dye.

17. The method of claim 16 wherein the infrared absorbing ink, pigment or dye is incorporated into the hard-copy output medium.

18. The method of claim 9 wherein the digital encoding means comprises an invisible encoding means using an ultraviolet absorbing ink, pigment or dye.

19. The method of claim 18 wherein the ultraviolet absorbing ink, pigment or dye is incorporated into the hard-copy output medium.

20. The method of claim 18 wherein the ultraviolet absorbing ink, pigment or dye is applied onto the hard-copy output medium.

21. The method of claim 9 wherein the digital encoding means comprises an invisible encoding means using an infrared fluorescing ink, pigment or dye.

22. The method of claim 21 wherein the infrared fluorescing ink, pigment or dye is incorporated into the hard-copy output medium.

23. The method of claim 21 wherein the digital encoding means comprises an invisible encoding means using an ultraviolet fluorescing ink, pigment or dye.

24. The method of claim 23 wherein the ultraviolet fluorescing ink, pigment or dye is incorporated into the hard-copy output medium.

25. The method of claim 23 wherein the ultraviolet fluorescing ink, pigment or dye is applied onto the hard-copy output medium.

26. The method of claim 21 wherein the digital encoding means comprises a visible modulation code on the rear surface of the hard-copy output medium.

27. The method of claim 21 wherein the digital encoding means comprises a digital data embedding technique.

28. The method of claim 21 wherein the digital encoding means includes a passive transponder.

29. The method of claim 9 wherein the limited color gamut digital image is determined by modifying color values that are outside the limited color gamut so that they are mapped to color values within the limited color gamut.

30. The method of claim 9 wherein the extended color gamut digital image has a larger range of chroma values than the limited color gamut digital image.

31. The method of claim 9 wherein the extended color gamut digital image has a larger luminance dynamic range than the limited color gamut digital image.

32. The method of claim 31 wherein the step of adjusting the color values of the extended color gamut digital image to determine the limited color gamut digital image includes applying a tone scale function to reduce the luminance dynamic range of the image.

33. The method of claim 9 wherein the extended color gamut digital image is a representation of the colors in an original scene.

34. The method of claim 33 wherein the limited color gamut digital image is determined by rendering the colors of the original scene to produce rendered color values that are desirable for the hard-copy output medium.

35. The method of claim 9 wherein a data compression technique is applied to the residual image before it is stored so that it can be represented by a smaller amount of digital data.

36. The method of claim 9 further including the step of using the residual image together with the limited color gamut output print to form a reconstructed extended color gamut digital image.

37. The method of claim 9 wherein the extended color gamut digital image originates from a scan of a photographic negative.

38. The method of claim 9 wherein the extended color gamut digital image originates from a scan of a photographic transparency.

39. The method of claim 9 wherein the extended color gamut digital image originates from a scan of a photographic print.

40. The method of claim 9 wherein the extended color gamut digital image originates from a digital camera.

41. The method of claim 9 wherein the residual image is determined by computing a difference between the extended color gamut digital image represented in an extended reference color space and the limited color gamut digital image represented in a reference color space.

42. The method of claim 9 further including the step of using the residual image together with the limited color gamut output print to form a digital image appropriate for display on an output device having a color gamut different that the limited color gamut of the original output medium.

43. The method of claim 42 wherein the limited color gamut output print is scanned using a digital print scanning means to determine a limited color gamut digital image.

44. The method of claim 42 including the step of recovering the digitally encoded residual image from output print.

45. A method for representing an extended color gamut digital image on a hard-copy output medium having a limited color gamut, comprising:
   a) providing e the hard-copy output medium including an oriented polymer;
   b) adjusting the color values of the extended color gamut digital image to fit within the limited color gamut of the hard-copy output medium to form a limited color gamut digital image;
   c) producing a limited color gamut output print from the limited color gamut digital image on the hard-copy output medium;
   d) determining a residual image representing a difference between the extended color gamut digital image and the limited color gamut digital image such that the residual image and the limited color gamut output print are adapted to be used to form a reconstructed extended color gamut digital image;
   e) storing the residual image using a digital storage means; and
   f) encoding information about the location of the stored residual image on the output print using a digital encoding means.

46. The method of claim 45 wherein the residual image is stored on a network server.

47. The method of claim 45 wherein the residual image is stored at an image data storage location.

48. The method of claim 45 wherein the residual image is stored on a transportable digital storage media.

49. A method for representing and manipulating an extended color gamut digital image on a hard-copy output medium having a limited color gamut, comprising:
   a) providing the hard-copy output medium including an oriented polymer;
   b) adjusting the color values of the extended color gamut digital image to fit within the limited color gamut of the hard-copy output medium to form a limited color gamut digital image;
   c) producing a limited color gamut output print from the limited color gamut digital image on the hard-copy output medium;
   d) determining a residual image representing a difference between the extended color gamut digital image and the limited color gamut digital image;
   e) encoding the residual image on the output print using a digital encoding means such that the residual image and the limited color gamut output print are adapted to be used to form a reconstructed extended color gamut digital image;
   f) specifying a desirable modification to the image; and
   g) using the residual image together with the limited color gamut output print and the specified desirable modification to the image to produce a modified digital image.

50. The method of claim 49 wherein the desirable modification is interactively user specified.

51. The method of claim 49 wherein the desirable modification is determined by applying an automatic algorithm to the digital image.

52. A computer storage product having at least one computer storage medium having instructions stored therein causing one or more computers to perform the method of claim 45.

53. A computer storage product having at least one computer storage medium having instructions stored therein causing one or more computers to perform the method of claim 34.

54. A computer storage product having at least one computer storage medium having instructions stored therein causing one or more computers to perform the method of claim 49.

* * * * *